United States Patent [19]

Ikkala et al.

[11] Patent Number: 5,783,111
[45] Date of Patent: Jul. 21, 1998

[54] ELECTRICALLY CONDUCTING COMPOSITIONS

[75] Inventors: Olli Ikkala, Merikasarminkatu; Lars-Olof Pietilä, Purismiehenkatu, both of Finland; Yong Cao, Goleta; Alejandro Andreatta, Santa Barbara, both of Calif.

[73] Assignees: Uniax Corporation, Santa Barbara, Calif.; Neste Oy, Espoo, Finland

[21] Appl. No.: 582,809

[22] Filed: Jan. 4, 1996

Related U.S. Application Data

[63] Continuation-in-part of Ser. No. 549,557, Oct. 27, 1995, abandoned, which is a continuation of Ser. No. 115,536, Sep. 3, 1993, abandoned.

[51] Int. Cl.$^6$ .................................................. H01B 1/12
[52] U.S. Cl. ................................................................ 252/500
[58] Field of Search ............................. 252/500, 518, 252/519; 528/422

[56] References Cited

U.S. PATENT DOCUMENTS

| | | | |
|---|---|---|---|
| 3,963,498 | 6/1976 | Trevoy | 430/631 |
| 4,025,463 | 5/1977 | Trevoy | 252/500 |
| 4,983,322 | 1/1991 | Elsenbaumer | 252/500 |
| 5,002,700 | 3/1991 | Otagawa et al. | 252/500 |
| 5,006,278 | 4/1991 | Elsenbaumer | 252/500 |
| 5,069,820 | 12/1991 | Jen et al. | 252/500 |
| 5,095,076 | 3/1992 | Clement et al. | 528/422 |
| 5,160,457 | 11/1992 | Elsenbaumer | 252/500 |
| 5,171,478 | 12/1992 | Han | 252/500 |
| 5,232,631 | 8/1993 | Cao et al. | 252/500 |
| 5,278,213 | 1/1994 | Han et al. | 524/233 |
| 5,281,363 | 1/1994 | Shacklette et al. | 252/500 |
| 5,346,649 | 9/1994 | Karna et al. | 252/500 |
| 5,520,852 | 5/1996 | Ikkala et al. | 252/519 |

FOREIGN PATENT DOCUMENTS

| | | |
|---|---|---|
| 152 632 | 8/1985 | European Pat. Off. . |
| 168 620 | 1/1986 | European Pat. Off. . |
| 168 621 | 1/1986 | European Pat. Off. . |
| 446 943 | 9/1991 | European Pat. Off. . |
| 497 514 | 8/1992 | European Pat. Off. . |
| 528178 | 2/1993 | European Pat. Off. ............... 252/500 |
| 545729 | 6/1993 | European Pat. Off. . |
| 04-04561 | 1/1992 | Japan ................................ 252/500 |
| WO 90/01775 | 2/1990 | WIPO . |
| WO 90/13601 | 11/1990 | WIPO . |
| 92-18987 | 10/1992 | WIPO ................................ 252/500 |
| WO 92/22911 | 12/1992 | WIPO . |
| 93-15510 | 8/1993 | WIPO ................................ 252/500 |

OTHER PUBLICATIONS

*Patent Abstracts of Japan,* vol. 17, No. 124 (C–1035), Mar. 16, 1993 JP–A–04 304 233, Tomoegawa Paper, Oct. 27, 1992.

Green, A.G., and Woodhead, A.E. "Aniline–Black and Allied Compounds, Part 1", J. Chem. Soc., vol. 101, pp. 1117 (1912).

Koybayashi, et al, "Electrochemical Reactions . . . of Polyaniline Film–Coated Electrodes", J. Electroanal. Chem. vol. 177, pp. 281–291 (1984).

Chiang, J.C. and MacDiarmid, A.G., "Polyaniline: Protonic Acid Doping of the Emeraldine Form to the Metallic Regime", Synthetic Metals, vol. 13, pp. 193–205 (1986).

Salaneck, W.R. et al, "A Two–Dimensional–Surface State Diagram for Polyaniline", Synthetic Metals, vol. 13, pp. 291–296 (1986).

Plastics Technology 37 (1991):9, pp. 19–20.

*Primary Examiner*—Michael Lewis
*Assistant Examiner*—Peter DiMauro
*Attorney, Agent, or Firm*—Armstrong, Westerman Hattori, McLeland & Naughton

[57] ABSTRACT

Compositions are disclosed comprising electrically conducting polyaniline and particular substituted aromatic compounds that simultaneously form hydrogen bonds and ring-ring interactions with, respectively, the NH-groups and the six-membered rings of the conducting polyanilines. The present conducting polyaniline compositions show drastically enhanced processibility and their blends with insulating or semiconducting materials exhibit significantly improved electrical properties.

21 Claims, 2 Drawing Sheets

ELECTRICALLY CONDUCTING COMPOSITIONS

This application is a Continuation-in-Part of application Ser. No. 08/549,557 filed Oct. 27, 1995, abandoned, which is a Continuation of application Ser. No. 08/115,536 filed Sep. 3, 1993, abandoned.

FIELD OF THE INVENTION

This invention relates generally to conducting polymers, and more particularly relates to electrically conductive compositions and shaped articles, such as parts, containers, fibers, tapes, films, coatings and the like, from polyanilines and blends thereof; and to the use of the same compositions and conductive articles. More specifically, this invention relates to liquid-phase processable, electrically conducting polyaniline compositions comprising particular substituted aromatic compounds that simultaneously form hydrogen bonds and ring-ring interactions with, respectively, the NH-groups and the six-membered rings of the conducting polyanilines. The present conducting polyaniline compositions show drastically enhanced processability and their blends with insulating or semiconducting materials exhibit significantly improved electrical properties.

BACKGROUND OF THE INVENTION

Electrically conductive, thermoplastic polymer compounds are of increased practical interest, for instance, for packaging electronic instruments and parts, and to solve a wide range of static discharge, electrostatic dissipation and electromagnetic shielding problems. Often, such compounds are made by mixing solid conductive particles such as carbon black, stainless steel fibers, silver or aluminum flakes or Nickel-coated fibers with insulating bulk thermoplastics, for example polystyrene, polyolefins, nylons, polycarbonate, acrylonitrile-butadiene- styrene co-polymers (ABS), and the like. These filled compounds are subsequently processed into desired shapes and articles by common plastics processing methods such as extrusion, injection molding and the like. Major problems related to the above, so-called "filled" thermoplastic compounds are that processing of these materials is not trivial and is often associated with excessive machine wear; and the final compounds frequently exhibit undesirable mechanical properties such as brittleness and a reduced elongation to break in comparison with the corresponding properties of the unfilled matrix polymer.

More recently, there has been an increased interest in replacing such carbon black or metal particle-filled compounds with intrinsically electrically conductive polymers and their blends with common insulating polymers. The latter systems are believed to be more cost competitive, easier to process and to exhibit desirable mechanical properties. Among the various conductive polymers, the polyanilines in particular have attracted special attention because of their excellent environmental stability and their low production costs.

Polyaniline is well known in the art, and its synthesis and the preparation of the electrically conductive form of this polymer by, for example, contacting polyanilines with protonic acids resulting in salt complexes has been disclosed. Green, A. G., and Woodhead, A. E., "Aniline-black and Allied Compounds, Part 1," J. Chem. Soc., Vol. 101, pp. 1117 (1912); Kobayashi, et al., "Electrochemical Reactions . . . of Polyaniline Film-Coated Electrodes," J. Electroanl. Chem., Vol. 177, pp. 281–91 (1984); U.S. Pat. Nos. 3,963, 498, 4,025,463, 4,983,322 and 5,232,631; Chiang, J. -C. and MacDiarmid, A. G., "Polyaniline: Protonic Acid Doping of the Emeraldine Form to the Metallic Regime", Synthetic Metals, Vol. 13, p. 196 (1986); Salaneck, W. R. et al., "A Two-Dimensional-Surface "State" Diagram for Polyaniline", Synthetic Metals, Vol. 13, p. 297 (1986). Typical examples of protonic acids disclosed in the above prior art are HCl, $H_2SO_4$, sulfonic acids of the type $R_1$-$SO_3H$, phosphoric acids, etc. Such acids form salt complexes with polyaniline, which may exhibit electrical conductivities of $10^{-3}$ S/cm or more. Their electrical properties make these so-called "doped" polyanilines [or, as used hereinafter, polyaniline salt complexes], and their blends and compounds with common insulating bulk polymers, suitable for a variety of the anti-static and shielding applications that are currently served by metal or carbon black filled systems.

Processing of polyanilines in different forms has been disclosed in several patents and patent applications. Major distinctions exist in the techniques employed and final materials properties, depending on whether the polyanilines are processed in the non-doped/non-conducting, or conducting salt complex form, and whether the material is in the solid or liquid phase during the processing operation. Generally, it is preferred that the polyaniline exists in its conductive salt complex form and is in a fluid phase during processing. The former condition eliminates the need for post-processing doping, which is cumbersome and uneconomical; the second preference regarding the fluid phase allows the formation of more homogeneous and a greater variety of products in comparison with the limited possibilities encountered in solid state processing.

In U.S. Pat. No. 5,006,278 a conductive product is disclosed which has been made by mixing a liquid, a doping agent and an undoped polyaniline, whereafter the liquid has been removed by evaporation. Patent Specification WO 8901694 describes a processable polyaniline doped with a sulfonic acid. The disclosed polyaniline is useful in processing conducting polymer blends using polyethylene, polypropylene and polyamides as the matrix polymer. In Patent Specification WO 9013601 a polymer mixture is prepared by mixing a suitable liquid with a mixture of polyaniline and a multi-sulfonic acid, used as a doping agent, whereafter the liquid is evaporated. According to this specification, the doping is generally carried out at 20°–25° C. It is disclosed that the doping can be carried out as a heterogeneous reaction, followed by dissolution of the mixture in a suitable solvent. The processing into a final shape is carried out in the presence of a solvent. (p. 15, 1.23). Patent Specifications WO 9010297, EP 152 632 and U.S. Pat. No. 5,002,700 disclose the use of dodecylbenzenesulfonic acid as a doping agent for polyaniline. Patent Specification WO 9001775 describes the use of multisulfonic acids as doping agents for polyaniline with the advantage of better thermal stability compared with other sulfonic acids. In the examples of this specification, the doping of polyaniline has been carried out in a suspension of polyaniline and the sulfonic acid in an aqueous solution of formic acid. In none of the examples of the above mentioned patent specifications, however, have adequate and economical methods been disclosed for processing of conductive polyanilines simply in their fluid form; i.e. by, for example, classic melt processing techniques employed in the thermoplastic polymer industry.

On the contrary, in the prior art, so-called "melt" processing of compounds comprising conductive polyanilines, has been executed by mechanically mixing of the components, wherein the conductive polyaniline is in the solid phase and only the matrix polymer in its molten form, before shaping the blend into the desired article. Generally, the blends obtained in this manner exhibit varying conductivity, often are non-homogeneous and, generally show poor mechanical properties and require a high content of polyaniline particles for the onset of electrical conductivity. In that sense such—erroneously labeled—"melt"-processible conductive thermoplastics closely resemble the well-known carbon black or metal particle-filled systems described above. For example, in Plastics Technology 37 (1991):9 p. 19–20 is disclosed the use of protonated, conductive polyanilines to impart conductivity to mixtures with common insulating thermoplastic polymers such as nylons and poly(vinylchloride). In this reference, the conductive polyaniline is in the form of solid, intractable particles, which, much like carbon black, are dispersed in the non-conducting matrix in its molten form. "Melt"-processing of these compounds require special dispersion techniques; Patent Specifications Nos. EP 168 620 and 168 621. As stated above, a relatively high content of conductive polyaniline is required to reach desirable levels of conductivity in the polyblend; or, in other words, the percolation threshold for the onset of conductivity is relatively high. [As used hereinafter, the percolation threshold is defined as the weight fraction of conductive material needed to impart a conductivity of $10^{-8}$ S/cm or more to a blend with an insulating matrix polymer.] Thus, in the aforementioned blends of solid polyaniline particles dispersed in poly(vinylchloride) a percolation threshold existed of about at least 13% w/w of the conductive polyaniline. Such high content of conductive polyaniline particles is not desirable, because it is not economical and, in addition, may substantially alter the mechanical properties of the blend in comparison with those of the pure matrix polymer.

An improved method of making homogeneous conductive polyaniline complexes in a semi-fluid phase, and blends of reduced percolation threshold has been disclosed in European Patent Application EP 545,729. According to this application, polyaniline, or derivatives thereof, and an excess of a functionalized organic protonic acid are mechanically mixed. A liquid-like mixture or suspension is obtained which subsequently is thermally solidified between 40°–250°C. As a result, a dry, solid composition is obtained in the form of a granulate comprising a functionalized protonic acid-doped polyaniline. The latter composition can subsequently be mixed with a thermoplastic polymer and formed into parts of desired shapes using standard polymer melt-processing techniques. Percolation thresholds for the onset of conductivity of parts made according to this method were lower than in the case where solid polyaniline particles were mixed with thermoplastic matrix materials. However, use of the required excess quantity of protonic acid is highly undesirable, as it causes the materials to be acidic, corrosive and hygroscopic, which is undesirable for processing and application of these compositions.

U.S. Pat. No. 5,232,631 discloses solution- and melt-processible polyaniline compositions and blends that exhibit much lower percolation thresholds, sometimes even below 1% w/w, of conductive polyaniline and a wide variety of non-conducting matrix polymers; such as, polyethylenes, isotactic polypropylene, elastomers, and the like; poly (vinylchlorid), polystyrene, nylons, such as nylon 6, nylon 12, and the like; poly(methylmethacrylate), polycarbonate, acrylonitrile-butadiene-styrene copolymers (ABS), and the like. However, in this patent the compositions that exhibit a low percolation threshold, invariably, are made from solutions of the conductive polyaniline and the matrix polymers in volatile organic solvents, which is uneconomical and environmentally hazardous and limits the use to products such as film, coatings and fibers. In the same patent, mixtures of conductive polyaniline and insulating matrix polymers, such as polyethylenes and isotactic polypropylene, are disclosed that are processed from the melt. However, in the examples shown, the percolation threshold was only slightly lower than for mixtures in which the conductive polyaniline is in the solid form during processing and simply dispersed; cf. Plastics Technology 37 (1991):9 p. 19–20. In addition, in this U.S. Pat. No. 5,232,631, and in Patent Application Fl 915760 it is disclosed that, in order to process conductive polyaniline from the melt and affect even a modest reduction in percolation threshold, an excess of protonic acid is needed, which renders the final blend undesirably acidic. As was pointed out above, the latter generally is unacceptable from a processing, application and environmental point of view. The excess acid, of course, can be removed, but this process is tedious and uneconomical, and limits the scope of the products that can be manufactured.

U.S. patent application Ser. No. 07/927858 teaches the use of reaction products of metal compounds and protonic acids as plasticizers for conducting polyanilines and for reducing the percolation threshold for the onset of conductivity in blends comprising bulk polymers; and for neutralizing acidic, protonated polyaniline compositions. This reference specifically teaches the use of the reaction product between zinc oxide and dodecylbenzenesulfonic acid as a plasticizer and neutralization agent for conducting forms of polyaniline and blends thereof. The use of the aforementioned reaction product in conducting polyaniline compositions, however, involves additional process steps that are uneconomical and reduce the environmental stability of the final materials. In addition, manufacturing of the above metal oxide-acid reaction products involves large amounts of highly corrosive and highly hygroscopic acids, which is unacceptable from a production and processing point of view.

Generally, the use of plasticizers are well known to those skilled in the art of polymer technology, and, not surprisingly, also has been employed in conductive polymer processing; EP 92300622.5, U.S. Pat. No. 5,171,478 and WO 92/22911. Typically, plasticizers are used to enhance flow, and/or reduce the viscosity of polymeric materials during processing; and generally form a part of the polymer composition. Along these well-known uses, EP 92300622.5 cited supra teaches the use of highly polar, ester-free plasticizer to plasticize the thermoplastic component of polymer blends comprising polyaniline. According to the text of this Patent Specification, the plasticizer is selected to facilitate the flow only of the thermoplastic matrix, such as poly(vinyl chloride); and not to induce flow, or dissolve the polyaniline.

U.S. Pat. No. 5,171,478, teaches the use of an extraordinary wide variety of chemical species termed plasticizers, ranging from water, p-toluene sulfonic acid to synthetic waxes and fluorinated hydrocarbons, to assist in thermally induced chain coupling of polyaniline which, according to the text, should be in the solid state (col. 6,l.25). Clearly, as is evident from the latter statement, and judging from their chemical nature, the suggested "plasticizing" species are not intended to facilitate flow, or dissolve the polyaniline component in the compositions.

Conventional use of commercially available plasticizers was disclosed in WO 92/22911. For example, Mesamoll (Bayer) was employed in a blend of conductive polyaniline and poly(vinyl chloride). However, Mesamoll is not a solvent for conductive polyaniline, and much like in the results in the above cited Plastics Technology 37 (1991):9 p. 19–20 a percolation threshold existed of more than 10% w/w of the conductive polyaniline.

Thus, in summary, clearly, a need still exists for electrically conductive polyaniline compositions that can be processed in the fluid phase that do not contain an excess of protonic acids; and for electrically conducting polyaniline blends with insulating bulk polymers that exhibit improved processability properties, morphology and electrical properties in combination with reduced acidity and hygroscopic properties and reduced percolation thresholds over the conducting polyaniline compositions known in the art. This need is addressed by the discoveries made by the present inventors that particular substituted aromatic compounds during processing simultaneously act as:

i. solvent for electrically conductive polyaniline complexes during processing; and
ii. compatibilizer in blends with insulating or semiconducting bulk polymers; thus yielding drastically reduced percolation thresholds for the onset of conductivity of such blends.

As is evident from the above analysis of the prior art of conducting polymer processing, no specific advantages are taught or suggested of employing particular substituted aromatic compounds that render conductive polyaniline fluid during processing, enhance flow, and reduce the percolation threshold in blends with insulating or semiconducting polymers. It will be demonstrated in the following description of the invention, and more specifically illustrated in the Examples attached hereto, that particular geometric arrangements of the various substituents are unexpectedly useful; and, in addition, in some cases may lead to the extremely unusual formation of useful crystalline solvates of electrically conductive polyaniline salt complexes and the particular substituted aromatic compounds. The latter compositions are remarkable in that they exhibit novel crystal structures that are different from either of their constituents; and have controllable melting temperatures.

SUMMARY OF THE INVENTION

It is accordingly an object of the present invention to provide electrically conductive compositions comprising electrically conducting polyaniline salt complexes that exhibit improved processibility and reduced acidity.

It is additionally an object of the present invention to provide electrically conductive compositions of conducting polyaniline salt complexes of improved processiblity and reduced acidity comprising particular substituted aromatic compounds that simultaneously form at least three of: one or more hydrogen bonds and one or more ring-ring interactions with, respectively, the NH-groups and the six-membered rings of the electrically conducting polyaniline salt complexes.

Yet another object of the present invention is to provide novel crystalline solvates comprising electrically conductive polyaniline complexes and substituted aromatic compounds.

Still another object of the present invention is to provide conductive blend compositions that exhibit improved processibility, reduced acidity, and reduced percolation thresholds for the onset of conductivity, comprising insulating or semiconducting bulk polymers and pre-polymers, electrically conductive polyaniline salt complexes and particular substituted aromatic compounds that simultaneously form at least three of: one or more hydrogen bonds and one or more ring-ring interactions with, respectively, the NH-groups and the six-membered rings of the electrically conducting polyaniline salt complexes, that can be processed from solution or from the melt.

Another object still of the present invention is to provide polymeric blends of insulating or semiconducting polymers comprising novel crystalline solvates of electrically conductive polyaniline complexes and substituted aromatic compounds.

It is still another object of the present invention to provide shaped articles, fibres, coatings, films, tapes and the like from electrically conductive compositions comprising electrically conducting polyaniline salt complexes and particular substituted aromatic compounds that simultaneously form at least three of: one or more hydrogen bonds and one or more ring-ring interactions with, respectively, the NH-groups and the six-membered rings of the electrically conducting polyaniline salt complexes.

Another object still of the present invention is to provide shaped articles, fibres, coatings, films, tapes and the like from electrically conductive compositions comprising electrically conducting polyaniline salt complexes, particular substituted aromatic compounds that simultaneously form at least three of: one or more hydrogen bonds and one or more ring-ring interactions with, respectively, the NH-groups and the six-membered rings of the electrically conducting polyaniline salt complexes, and insulating or semiconducting bulk polymers and pre-polymers.

Another object still yet of the present invention is to provide shaped articles, fibres, coatings, films, tapes and the like from electrically conductive compositions comprising novel crystalline solvates of electrically conductive polyaniline complexes and substituted aromatic compounds, and insulating or semiconducting bulk polymers and pre-polymers.

Additional objects, advantages and novel features of the invention will be set forth, in part, in the description which follows, and, in part, will become apparent to those skilled in the art on examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
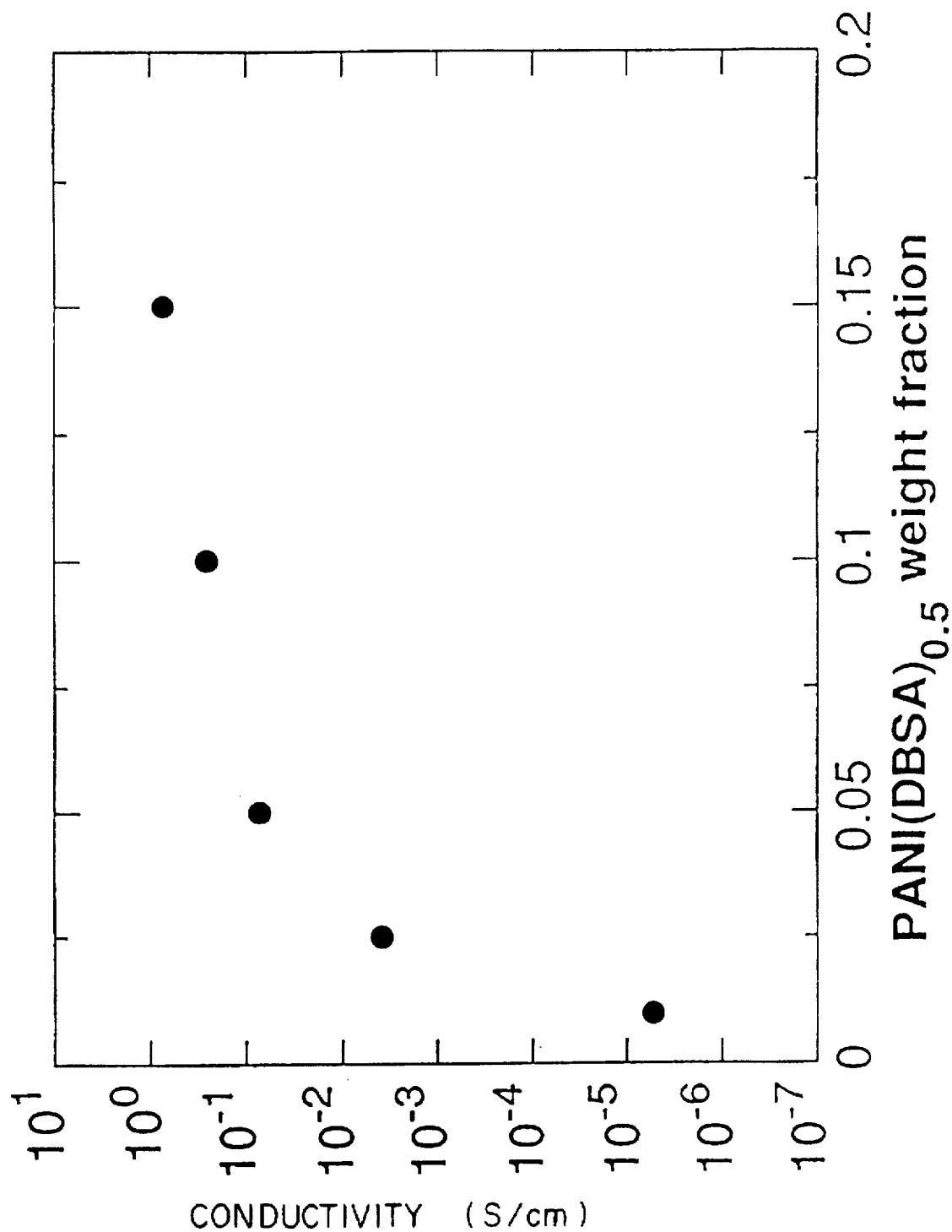
FIG. 1. The electrical conductivity of melt-processed blends of polypropylene, $PANI(DBSA)_{0.5}$ and stearyl gallate (SG) plotted as a function of the content of the conducting polyaniline salt complex.

The electrically conducting compositions of this invention typically comprise the following ingredients.

(i) One or more electrically conducting unsubstituted or substituted polyaniline or co-polymer salt complexes, or mixtures thereof;

(ii) One or more substituted aromatic compounds that simultaneously form at least three of: one or more hydrogen bonds and one or more ring-ring interactions with, respectively, the NH-groups and the six-membered rings of the electrically conducting polyaniline salt complexes (i).

(iii) One or more optional organic substrate phases. This phase is an insulating or semiconducting material, and can be one or more polymers or pre-polymers, or mixtures thereof, which is fluid during compounding or mixing with (i) and (ii) and/or during shaping into the conductive article.

Surprisingly, the inventors have discovered that, unlike the electrically conductive compositions described in the prior art, the materials according to the present invention, which do not contain an excess protonic acid, i. display outstanding processability in the fluid form, i.e. solution or melt;

ii. are substantially less acidic; and iii. are less hygroscopic; and, in addition, in blends with insulating or semiconducting matrix polymers:

iv. exhibit improved compatibility between the conducting polyaniline salt complex and the matrix material; which results in v. a remarkably low percolation threshold for the onset of conductivity.

Furthermore, the inventors have discovered extremely unusual crystalline solvates of electrically conductive polyaniline salt complexes and substituted aromatic compounds. The latter compositions are remarkable in that they exhibit novel crystal structures that are different from either of their constituents; and have controllable melting temperatures.

The Electrically Conducting Polyaniline

One ingredient in the present compositions is electrically conducting unsubstituted or substituted polyaniline salt complexes or an electrically conducting polyaniline copolymer salt complex, or mixtures thereof, as described in U.S. Pat. Nos. 5,069,820 and 5,160,457 and U.S. Pat. No. 5,232,631. When the term "electrically conducting polyaniline salt complex" is used in this application, it is used generically to include electrically conducting unsubstituted and substituted polyanilines and electrically conducting polyaniline copolymers, and mixtures thereof, that have been rendered electrically conducting by protonation of the corresponding non-conducting forms of polyanilines by the use of one or more strong protonic acids with a pKa value of less than about 3.0; unless the context is clear that only the specific nonsubstituted form is intended.

The non-conducting polyaniline used for the preparation of the electrically conductive polyaniline salt complexes according to practice of this invention can be in any of its physical forms. Illustrative of useful forms are those described in U.S. Pat. Nos. 5,232,631 and 4,983,322, incorporated by reference herein. For unsubstituted polyaniline, useful forms include leucoemeraldine, protoemeraldine, emeraldine, nigraniline and pernigraniline forms. Useful polyanilines can be prepared by any chemical and electrochemical synthetic procedures referred to, for example, in the above references incorporated herein.

In general, the non-conducting forms of polyanilines useful for the preparation of the electrically conductive polyaniline salt complexes used in practice of this invention are those which are of sufficiently high molecular weight to exhibit high electrical conductivity; i.e., those polyanilines having a weight average molecular weight of more than 5,000 daltons. In general substituted and unsubstituted polyanilines and polyaniline copolymers will be of at least 20 repeat units. In the preferred embodiments of the invention, the number of repeat units is at least about 25, and in the most preferred embodiments, the number of repeat units is at least about 50.

Particularly preferred for the use in the practice of this invention, is the electrically conducting polyaniline that is derived from the non-conducting unsubstituted polyaniline and protonated to its electrically conducting form by the use of one or more protonic acids that have a pKa value of less than about 3.0. Preferred protonic acids are those that protonate the polyaniline to form a salt complex, having an electrical conductivity of greater than about $10^{-6}$ S/cm. Among the preferred protonic acids, particularly preferred are those that belong to the class of acids that impart a conductivity of greater than about $10^{-3}$ S/cm to the salt complex with polyaniline. Amongst these particularly preferred embodiments, most preferred are those embodiments in which said polyaniline salt complex has a conductivity greater than about 1 S/cm.

Protonic acids are well known as dopants in the conductive polymer art as shown by the reference to J. C. Chiang and A. G. MacDiarmid; the reference to W. R. Salaneck et al and to U.S. Pat. Nos. 5,069,820 and 5,232,631.

The Substituted Aromatic Compound

A second, critical ingredient of the compositions of the present invention is one or more particular substituted aromatic compounds. The unique roles of this substance are that of a "solvent-plasticizer" of conductive polyaniline complexes; and, additionally, of "compatibilizer" in blends of the conductive polymer with insulating or semiconductive polymers or prepolymers.

Unlike commonly used plasticizers, which in the art of conductive polymer processing often are added to improve dispersion of solid conductive particles in molten polymers, the substituted aromatic compounds used according to the present invention, during processing dissolve the electrically conductive polyaniline salt complexes, and form strong molecular associations with them. Due to this unique feature, the conductive polyaniline salt complexes during processing are in their fluid form, which has the above described major advantages with regard to product homogeneity, properties, and shaping options. And, unlike commonly used solvents, the substituted aromatic compounds according to the present invention form a permanent and integral part of the compositions. Interestingly, and surprisingly, the molecular interactions between the substituted aromatic compounds and the electrically conductive polyaniline salt complexes may be so strong, that their mixtures can form the extraordinary class of materials known as crystalline solvates. These materials exhibit novel crystalline structures that are different from each of their constituent, and have many useful properties, such as controllable melting temperatures. In addition, depending on the specific properties of the substituted aromatic compounds, such solvates may exhibit unusual electrical, optical magnetic and mechanical characteristics.

The second important role of the substituted aromatic compounds of the present invention is that of a "compatibilizer" in blends of the conductive polyaniline complexes and insulating or semiconductive polymers or pre-polymers. The designation "compatibilizer" hereinafter refers to a species that improves the interaction between two immiscible liquid phases through close matching of the physiochemical nature of the species and the two liquids. Thus, for example, common surfactants reduce the interfacial tension of water and oil, and, therewith "compatibilize" these two liquids, as it is understood in this invention. This compatibilizing is achieved in this simple example by providing a species (the surfactant) that has two covalently bonded moieties: one of which that strongly interacts with water; and the other moiety that has a favorable interaction with oil. The compatibilizing role of the substituted aromatic compounds according to the present invention in blends of the conducting polyaniline complexes and insulating or semiconductive polymers is similarly understood. For example, in blends of the conducting polyaniline complexes with insulating polymers selected from the group of polar polymers, such as nylons, the substituted aromatic compounds shall have a moiety that favorably interacts with the polar polymers, and hence contain common polar groups such as, for example, —OH, —O—, —COOH, —COOCH$_2$—, —CO—, —SH, —S—, —SO$_2$—, —PO$_3$—, —NO$_2$, —CN, —CON=, the halogens, —F, —Cl, —Br, —I; and the like. Alternatively, in blends with non-polar or weakly polar polymers, such as polyethylene, polypropylene, and the like, the substituted aromatic compound shall have a non-polar or weakly polar moiety, such as alkyls, alkenyl, cycloalkyls, phenyls, and the like. Clearly, the selection of the appropriate compound from the various substituted aromatic compounds, to be specified in detail hereafter, for optimum use in blends with insulating or semiconductive polymers is guided by the physiochemical nature of the latter, according to the well-established rules of chemical affinity known to those skilled in the art.

The critically important feature of the substituted aromatic compounds according to the present invention is that they are capable of simultaneously forming hydrogen bonds and ring-ring interactions with, respectively, the NH-groups and the six-membered rings of conducting polyaniline salt complexes.

Preferred substituted aromatic compounds are those according to Formula :

$$A_iB_j \qquad \text{Formula I}$$

wherein:

i is an integer greater than 0;

j is an integer greater than 0, with the proviso that the sum of i and j is equal to or greater than 3;

A is a moiety capable of forming ring-ring interactions with the six-membered rings of electrically conducting polyaniline complexes; and is independently selected so as to be the same or different at each occurrence and is selected from the group consisting of substituted or unsubstituted 3, 4, 5, 6, or 7-membered aromatic or alicyclic rings, which rings may optionally include one or more divalent nitrogen, sulfur or oxygen atoms; and their substituted or unsubstituted condensed rings; and B is a moiety capable of forming hydrogen bonds to the NH-groups of the electrically conducting polyaniline complex; and is independently selected so as to be the same or different at each occurrence and is selected from the group consisting of —OH, —COOH, —COO, —CO—, —SO—, —SO$_2$—, —OCOO—, —O—, —SH, —S—, —PO$_3$—, —NO$_2$, —CN, —CON=, the halogens —F, —Cl, —Br, —I;

Amongst these preferred embodiments, particularly preferred are those substituted aromatic compounds according to Formula I wherein:

A is independently selected so as to be the same or different at each occurrence and is selected from the group consisting of substituted or unsubstituted 5 or 6-membered aromatic rings, which rings may optionally include one or more nitrogen, sulfur or oxygen atoms; and their substituted or unsubstituted condensed rings; and At least one B is —OH.

More preferred among the particularly preferred substituted aromatic compounds for use in this invention are those according to Formula II:

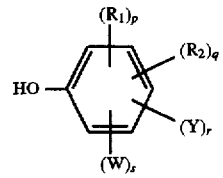

Formula II wherein:

p, q, r and s are integers from 0 to 5, with the proviso that the sum of p and q and r and s is equal to 5;

R$_1$ is H, OH, CH$_3$ or OCH$_3$; where one or more H can be substituted by the halogens F and Cl; except in —OH;

R$_2$ is independently selected so as to be the same or different at each occurrence and is selected from the group consisting of H, OH, alkyl, alkenyl alkoxy, alkanoyl, alkylthio, alkylthioalkyl, alkyl amide, alkylamidealkyl, alkyl hydroxy, alkyl carboxyl, having from 1 to about at least 20 carbon atoms; or alkylaryl, arylalkyl, alkylsulfinyl, alkoxyalkyl, alkylsufonyl, alkoxycarbonyl, where the alkyl or alkoxy has from 0 to about 20 carbon atoms; or alkyl having from 1 to about 20 carbon atoms; or any two R$_2$ groups together may form an alkylene or alkenylene chain completing a 3, 4, 5, 6, or 7-membered aromatic or alicyclic ring, which ring may optionally include one or more divalent nitrogen, sulfur or oxygen atoms; R can be branched and can be tert-alkyl, the alkyl having from 1 to about 20 carbon atoms; R$_2$ may include one or more of the polar substitutes —NO$_2$, or —CN, or the halogens, —F, —Cl, —Br, —I;

Y is independently selected so as to be the same or different at each occurrence and is selected from the group consisting of —OH, —COOH, —COO—Z, —CO—Z, —SO—Z, —SO$_2$—Z, —OCOO—Z, wherein Z=alkyl with 1 to about 20 carbon atoms preferably more than about 10 carbon atoms;

W is independently selected so as to be the same or different at each occurrence and is selected from the group consisting of X$_1$, —C(C$_n$H$_{2n+1}$)(C$_m$H$_{2m+1}$)—X$_1$, where n and m are integers from 1 to about at least 20, —COO—X$_1$, —CO—X$_1$, —OCO—X$_1$, —CH$_2$—O—X$_1$, —O—CH$_2$—X$_1$, —O—X$_1$, —S—X$_1$, —SO—X$_1$, —SO$_2$—X$_1$, —OCOO—X$_1$, —COO—CH$_2$—X$_1$, —OCO—CH$_2$—X$_1$, —CH$_2$—COO—X$_1$, —CH$_2$—OCO—X$_1$, —O—C$_2$H$_4$—O—X$_1$, —CH$_2$—X$_1$, cyclohexane, or 5 or 6-membered aromatic, heteroalicyclic, heteroaromatic or alicyclic carbon ring; and

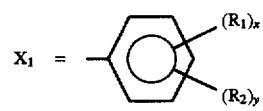

Formula III wherein:

x and y are integers from 0 to 5 with the proviso that the sum of x and y equals 5; and R$_1$ and R$_2$ are as described above;

Among these more particularly preferred substituted aromatic compounds the especially preferred are those according to Formulas IV-X:

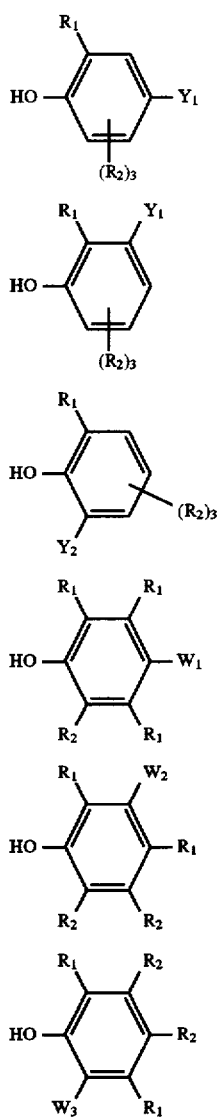

wherein:

$R_1$ and $R_2$ are described as above; and $Y_1$, is selected from the group consisting of —OH, —COOH, —COO—Z, —CO—Z, —SO—Z, —SO$_2$—Z, —OCOO—Z, wherein Z=alkyl with 1 to about 20 carbon atoms, preferably more than about 10 carbon atoms;

$Y_2$ is —OH;

$W_1$, is selected from the group consisting of $X_1$, —C($C_nH_{2n+1}$)($C_mH_{2m+1}$)—$X_1$, where n and m are integers from 1 to about at least 20, —COO—$X_1$, —CO—$X_1$, —OCO—$X_1$, —CH$_2$—O—$X_1$, —O—CH$_2$-$X_1$, —O—$X_1$, —S—$X_1$, —SO—$X_1$, —SO$_2$—$X_1$, —OCOO—$X_1$, cyclohexane, or 5 or 6-membered aromatic, heteroalicyclic, heteroaromatic or alicyclic carbon ring; and $W_2$ is selected from the group consisting of $X_1$, —C($C_nH_{2n+1}$)($C_mH_{2m+1}$)—$X_1$, where n and m are integers from 1 to about at least 20, —COO—$X_1$, —CO—$X_1$, —OCO—$X_1$, —O—$X_1$, —S—$X_1$, —SO—$X_1$, —SO$_2$—$X_1$, —OCOO—$X_1$, —COO—CH$_2$—$X_1$, —OCO—CH$_2$—$X_1$, —CH$_2$—COO—$X_1$, —CH$_2$—OCO—$X_1$, —O—$C_2H_4$—O—$X_1$, cyclohexane, or 5 or 6-membered aromatic, heteroalicyclic, heteroaromatic or alicyclic carbon ring; and $W_3$ is selected from the group consisting of $X_1$, —C($C_nH_{2n+1}$)($C_mH_{2m+1}$)—$X_1$, where n and m are integers from 1 to about at least 20, —COO—$X_1$, —CO—$X_1$, —OCO—$X_1$, —O—$X_1$, —S—$X_1$, —SO—$X_1$, —SO$_2$—$X_1$, —OCOO—$X_1$, —CH$_2$—$X_1$, cyclohexane, or 5 or 6-membered aromatic, heteroalicyclic, heteroaromatic or alicyclic carbon ring; and

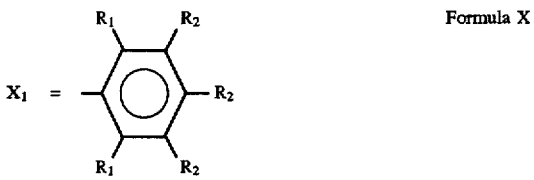

wherein $R_1$ and $R_2$ are as described above.

Among the especially preferred substituted aromatic compounds the most preferred compounds are those according to above Formulas IV-X; with the proviso that at least one $R_1$, $R_2$, $Y_1$, $Y_2$, $W_1$, $W_2$ or $W_3$ substituent adjacent to at least one —OH substituent on any benzene ring is selected from the group consisting of H and —OH.

It is also envisaged that the substituted aromatic compounds are part of oligomeric or polymeric chain molecules; in the polymer chain or as pendant side-groups. Such oligomeric or polymeric substituted compounds can be prepared according to the usual polymerization or functionalization and substitution methods known to those skilled in the art of synthesis of oligomers and polymers. For example, in one embodiment, the substituted aromatic compounds of the present invention comprise a polymerizable moiety, such as substituted and unsubstituted unsaturated C—C bonds, or moieties that can be polymerized by well-known polycondensation methods, and the like. Such polymerizable compounds can be polymerized to yield an oligomeric or polymer chain comprising a multitude of substituted aromatic functional groups useful according to the present invention.

In another embodiment, oligomeric and polymeric materials can be functionalized with one or more substituted aromatic moieties according to the present invention. Such functionalization can be carried out according to any technique well known to those skilled in the art of substituted and functionalized polymers.

Such embodiments are fully anticipated and comprised within the scope and embodiments of this invention.

The Substrate Phase

A fourth, optional, component of the materials of the compositions of this invention is a substrate phase. This can be oligomeric, or polymeric, or pre-polymeric materials which can be transformed into a fluid (liquid or semisolid) form during processing so as to achieve the required intimate mixing with the electrically conducting polyaniline salt complex and the solvent-plasticizing substituted aromatic compound. The substrate phase can be electrically insulating or semiconductive. Useful common polymeric substrates are those belonging to the group of thermoplastic and thermoset polymers.

Illustrative of thermoplastic polymers are polymers derived from the polymerization of α,β-unsaturated monomers such as polyethylene, acrylonitrile/butadiene/styrene terpolymer, polypropylene, poly(1-butene), poly(3-methyl-1-butene), poly(1-pentene), poly(4-methyl-1-pentene), poly (1-hexene), polyisobutylene, polyisoprene, polystyrene, poly(α-methylstyrene), poly(2-methylstyrene), poly(vinyl fluoride), poly(vinyl chloride), poly(tetrafluoroethylene) (Teflon), poly(vinyl alcohol), poly(vinyl methyl ether), poly (vinyl methyl ketone), poly(vinyl acetate), poly(vinyl pyrrolidone), poly(acrylic acid), poly(methyl methacrylate), polyacrylonitrile, and the like, polydienes such as poly(1,3-butadiene); polyoxides such as poly(ethylene oxide), poly (propyleneoxide), polyacetaldehyde, poly(styrene oxide) and the like; polysulphides such as poly(propylene sulphide), poly(phenylene sulphide) and the like; and polysulfones; polyesters such as poly(glycolic acid), poly (ethylene adipate), poly(ethylene succinate), poly(ethylene terephtalate) and the like; polyamides such as nylon 6, nylon 7, nylon 8, nylon 9, nylon 10, nylon 6,6, nylon 8,8 and, poly(p-phenylene terephtalamide)(Kevlar) and the like; polycarbonates such as poly(methanebis(4-phenyl) carbonate) and the like.

Illustrative of thermoset polymers are polymers derived from alkyds derived from the esterification of a polybasic acid such as phthalic acid and a polyhydric acid such as glycol; allylics such as those produced by polymerization of diallyl phtalate, diallyl isophtalate, diallyl maleate and the like; amino resins such as those produced by addition reaction between formaldehyde and such compounds as melamine, urea, sulfonamide; epoxies such as epoxy phenol novolak resins, diglycidyl ethers, diclycidylethers of bisphenol A and the like; phenolics such as resins derived from reaction of substituted or unsubstituted phenols such as cresol, and phenol with an aldehyde, such as formaldehyde and acetaldehyde; polyesters; silicones and urethanes.

Overall Compositions

The proportions of materials of the present invention can vary widely, depending on the desired level of conductivity and the application. However, the relative amounts of the electrically conducting polyaniline salt complexes and the substituted aromatic compounds is such that during processing a homogeneous solution and/or plasticized melt is obtained.

Typically, the compositions of this invention include electrically conductive polyaniline, substituted polyaniline, copolymers and/or mixtures thereof, produced by protonation with from about 0.1 to 0.6 moles of protonic acid per substituted or unsubstituted aniline repeat unit (PhN); more preferably from about 0.2 to 0.6 moles; and most preferred from about 0.3 to 0.5 moles of protonic acid.

The amount of substituted aromatic compound may vary widely, depending on the application, the desired conductivity, the molecular weight of the substituted aromatic compound, and the amount of electrically conductive polyaniline salt complex in the final composition. Typically, however, the molar ratio between amount of substituted aromatic compound and the polyaniline repeat unit PhN is from about 0.1 to about 100; more preferably from about 0.2 to 50 and most preferably from about 0.3 to 25.

The amount of insulating substrates in blends with the conductive polyaniline salt complexes and substituted aromatic compounds according to the present invention may vary widely, and is dependent on the desired level of conductivity. Hence, the content of insulating substrates ranges from at least about 1% by weight to about 99.95% by weight, preferably from about 5% by weight to about 99.9% by weight, and most preferably from about 10% by weight to about 99.5% by weight.

Optional common additional components may be included in the compositions of the present invention. Examples of such additional components include other conductive polymers, other polymers such as poly(3-alkylthiophenes) which may become conductive upon doping, graphite, metal conductors, reinforcing fibers, inert fillers (such as clays and glass), dyes, common plasticizers, and the like.

The method of preparing and forming the compositions of this invention is not critical and can vary widely. Standard polymer processing operations can be employed, such as solid-state blending and subsequent melting or dissolving, melt-blending and solution-blending or combinations thereof. Also, common shaping operations can be used to manufacture useful articles from the present compositions, such as extrusion, thermo-forming, blow molding, injection molding, rotational molding, reactive molding, foaming and the like; common fiber spinning methods can be employed, such as melt-spinning, dry-spinning, wet-spinning, air-gap spinning, gel-spinning, flash-spinning and the like; films can be cast from the melt or solutions of the present compositions to yield dense or porous articles or membranes, or can prepared by calendering, film-blowing, and the like.

In the event that additional non-soluble components are present (or suspended) in the compositions of the present invention, the protonated conductive polymer will form around, or be filled with, the insoluble material. If, for example, the additional components are glass fibers, the relative amounts of fibers and protonated conductive polymer remaining will cause either the polymer to be fiber-filled, the fibers to be polymer coated or impregnated, or some intermediate composite of fibers and protonated conductive polymer to be formed. In the case of systems wherein the amount of non-soluble component greatly exceeds the protonated conductive polymer remaining, individual particles or shapes of non-soluble components coated or impregnated with protonated conductive polymer will be formed. Examples of articles formed from non-soluble components and the present polymer solutions include conductive polymer coated housings for sensitive electronic equipment (microprocessors), infrared and microwave absorbing shields, flexible electrical conducting connectors, conductive bearings, brushes and semi-conducting photoconductor junctions, antistatic materials for packaging electronic components, carpet fibers, waxes for floors in computer rooms and an antistatic spray finisher for plastics, and thin, optically transparent antistatic finishes for CRT screens, aircraft, auto windows and the like.

It is also contemplated to use the present compositions as either liquid conductor or liquid semiconductor, much in the manner that liquid mercury is used in various devices. Examples of such devices include gravity switches, fluid level detecting devices or other electrical or electronic switches.

The following general methods and specific examples are presented merely to illustrate the invention and are not to be construed as limitations thereon.

Method A-1

Polyaniline (PANI) was prepared according to the method described by Y. Cao, A. Andreatta, A. J. Heeger and P. Smith, Polymer, 30 (1989) 2305: A solution of 40 ml of freshly distilled aniline (Aldrich), 50 ml of 35% HCl (Fisher) and 400 ml distilled water was prepared in an 1 L Erlenmeyer flask. The flask was placed in a cooling bath maintained at 0° C. Polymerization was effected by addition of an oxidant solution consisting of 46 g of $(NH_4)_2S_2O_8$ (Aldrich) and 100 ml of distilled water. After all oxidant was added (over a period of time of 2 hr), the flask was capped and left stirring for an additional 3 hours. The precipitated polymer powder was recovered, filtered and washed with distilled water until the pH of the washing liquid was 6–7. Subsequently, the polymer was washed with methanol until the liquid was clear, and then with ethyl ether to eliminate residual water and methanol. Finally, the polymer was dried in a vacuum oven at room temperature for 48 hours.

The non-conductive emeraldine base form of polyaniline was prepared by compensation of the polyaniline salt. An amount of 10 g of polyaniline salt was stirred with 1000 ml of 3% $NH_4OH$ solution during 2 hours at room temperature. The resulting emeraldine base was filtrated and washed by distilled water until the pH of washing liquid was 7–8. Subsequently, the polymer was washed by methanol until the washing liquid was colorless and then, with methanol and ethyl ether. The inherent viscosity of the obtained emeraldine base as measured in an Ubbelohde viscometer at a temperature of 25° C. in a 0.1 w/w solution in 97% $H_2SO_4$ is typically 1.2 dLg.

Method A-2

Conductive polyaniline salt complexes were prepared by the following two methods:1) an amount of 1.81 g (0.02M) emeraldine base (EB) prepared as in Method A-1, was mixed thoroughly with 3.265 g (0.01M) of p-dodecylbenzene sulfonic acid (DBSA) (Tokyo Kasei) using an agate mortar and pestle in a dry bag filled with nitrogen. The molar ratio of DBSA to emeraldine base unit was 0.5; sufficient to completely protonate the emeraldine base form into the conducting salt form; 2) the same amount of emeraldine base and DBSA were mixed with 50 ml anhydrous ethanol and stirred at 500° C. for one hour. After most of ethanol was removed, resulting powder was dried at vacuum oven at 500° C. for 24 hours. Similarly, polyaniline-camphorsulfonic acid (CSA), toluenesulfonic acid (TSA) conductive salt complexes were prepared with molar ratio of acid/polyaniline repeat unit (PhN) equal to 0.5.

Method B 1 part by weight of electrically conducting polyaniline salt complex and 10 weight parts of substituted aromatic compound were mixed in an Erlenmeyer flask in an oil bath for 5 minutes using a magnetic stirrer. The temperature of the oil bath was maintained constant typically between 160° C. and 250° C., depending on the melting point of the substituted aromatic compound. After 5 minutes of mixing a sample was taken and pressed between two microscope glass slides and heated to the same temperature as where mixing was performed. The solubility of the electrically conducting polyaniline salt complex in the substituted aromatic compound was investigated using a polarizing light optical microscope. If a homogeneous, one-phase liquid, free of any remaining solid particles was observed, the aromatic compound was classified as a solvent for the polyaniline complex at the temperature of mixing. If some dispersed particles with softened edges were observed the aromatic compound was designated as a poor solvent at the temperature of mixing. If a clear dispersion of solid particles without softened edges was observed, the substituted aromatic compound was classified as a nonsolvent for the conductive polyaniline complex at the temperature of mixing.

Method C

An amount of 4.6 g of electrically conducting polyaniline salt complex, 13.8 g substituted aromatic compound and 27.6 g high density polyethylene powder (HDPE, Neste NCPE 3415, weight average molecular weight of 250000) were mechanically mixed in a mortar. The resulting dry blend was mixed using a Haake Rheocorder at a temperature of 190° C. for 5 minutes at a rotation speed of 100 rpm. After cooling the resulting blend, the material was molded, bar-shaped test pieces were cut and their electrical conductivity was measured using the conventional 4-probe method.

Method D

An amount of 0.35 g of electrically conducting polyaniline salt complex, 1.05 g substituted aromatic compound and 2.1 g isotactic polypropylene powder (PP, Neste VC 12, weight average molecular weight 270000) were mixed together in a mortar. The above dry blend was mixed using a miniature, co-rotating conical twin-screw extruder at a temperature of 170° C. for 5 minutes and at rotation speed of 100 rpm. The resulting blends was discharged and subsequently, the material were compression molded into a film at 190° C., in 15 seconds and quickly cooled between two metal plates. The electrical conductivity of the resulting film was measured using the 4-probe method.

Comparative Example Ia (Outside of the Invention)

PANI was protonated by methane sulphonic acid $CH_3$—$SO_3H$ (MSA) using the Method A-2 to form $PANI(MSA)_{0.5}$. The solubility of 10 parts by weight $PANI(MSA)_{0.5}$ to 90 parts by weight to sulphonic acid of Table 1 was investigated according to Method B using mixing temperature of 200° C.

TABLE 1a

Additional sulphonic acids used as solvents for $PANI(MSA)_{0.5}$, $PANI(TSA)_{0.5}$, $PANI(DBSA)_{0.5}$, and $PANI(CSA)_{0.5}$

| Methane sulphonic acid (MSA) | $CH_3$—$SO_3H$ |
|---|---|
| Toluene sulphonic acid (TSA) | $CH_3$—⟨phenyl⟩—$SO_3H$ |
| Dodecyl benene sulphonic acid (DBSA) | $C_{12}H_{25}$—⟨phenyl⟩—$SO_3H$ |
| Camphor sulphonic acid (CSA) | camphor structure with $CH_3$, $CH_3$, $CH_2$—$SO_3H$, =O |

It was observed that 10 w/w % $PANI(MSA)_{0.5}$ is soluble to 90 w/w % MSA, TSA, DBSA or CSA.

The previous tests were repeated by using TSA, DBSA or CSA as dopants: PANI was protonated by TSA, DBSA or CSA using the Method A-2 to form $PANI(TSA)_{0.5}$, $PANI(DBSA)_{0.5}$, and $PANI(CSA)_{0.5}$. The solubility of 10 parts by weight $PANI(TSA)_{0.5}$, $PANI(DBSA)_{0.5}$, and $PANI(CSA)_{0.5}$ to 90 parts by weight to sulphonic acids of Table 1a was investigated according to Method B using mixing temperature of 200° C. It was observed that also 10 w/w % $PANI(TSA)_{0.5}$, $PANI(DBSA)_{0.5}$, and $PANI(CSA)_{0.5}$ are soluble to 90 w/w % MSA, TSA, DBSA or CSA.

One can conclude that PANI protonated even by the simplest sulphonic acid MSA to form $PANI(MSA)_{0.5}$ is soluble to even the simplest sulphonic acid MSA. Therefore no particular chemical structure of $R_1$ of the protonating sulphonic acid $R_1$-$SO_3H$ or $R_2$ of the solubilizing sulphonic acid $R_2$—$SO_3H$ is required for solubility because the main functional group is $SO_3H$. Therefore possible hydroxyl or other hydrogen bonding groups within $R_1$ or $R_2$ play no role on the solubility to sulphonic acids $R_2$—$SO_3H$.

Comparative Example IIa (Outside of the Invention)

As particular examples of sulphonic acids, assume sulfodyes according to WO 93/15510 according to Table 2a.

TABLE 2a

Examples of sulfodyes pyrogallol red
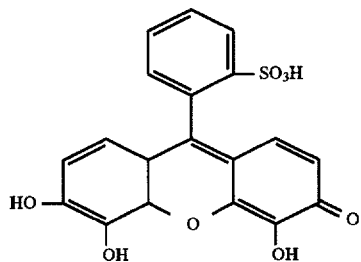

pyrocatechol violet
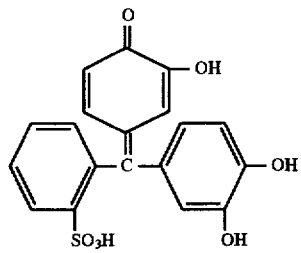

cresol red
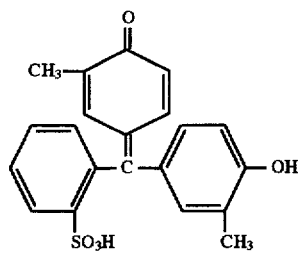

phenol red
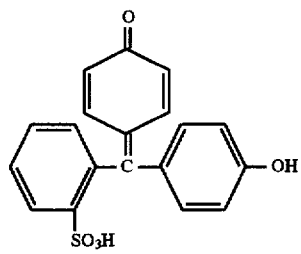

xylenol blue
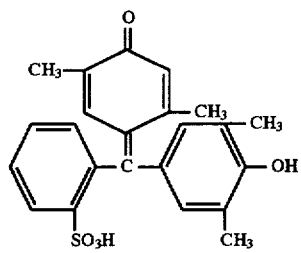

WO 93/15510 discloses also xylenol orange and sulforhodamines which all are also sulphonic acids. According to Comparative Example Ia the sulphodyes of WO 93/15510 (being sulphonic acids) are solvents of sulphonic acid doped PANI (taken that the particular sulfodyes melt at all).

Note that all sulphonic acids are strong acids with typically $pK_a<1$, thus being strongly corrosive. Henceforth their technological value is questionable. Therefore in this patent application the inventors searched for substantially less acidic solvents.

It is known from previous art that solubility of high polymers to solvents is augmented by strong specific interactions between the solvent and polymer molecules. If one exposes emeraldine base to sulphonic acid, one of the expected specific interactions is protonation of the iminic nitrogens. The essential protonation is known in the previous art to take place only if the acid is sufficiently acidic with $pK_a$ less than about 3. Therefore in the following the inventors search for novel solvents which are not able to protonate i.e. are less acidic i.e. $pK_a$ is greater than about 3.

Comparative Example IIIa (Outside of the Invention)

According to the teachings of WO 92/22911, DBSA and CSA were selected to be the protonating acids to prepare $PANI(DBSA)_{0.5}$ and $PANI(CSA)_{0.5}$. Outside WO 92/22911, MSA was selected as the most simple sulphonic acid dopant to form $PANI(MSA)_{0.5}$. The protonations were performed according to Method A2. Further more, typical solvents of WO 92/22911 were selected: 3-methoxy phenol, 2-methyl-4-methyl phenol, m-cresol and p-cresol. The solubility of 10 parts by weight of $PANI(DBSA)_{0.5}$, $PANI(CSA)_{0.5}$ and $PANI(MSA)_{0.5}$ to 90 parts by weight of 3-methoxy phenol, 2-methyl-4-methyl phenol, m-cresol and p-cresol was studied according to Method B using mixing temperature of 200°–210° C.

| PANI-complex | Organic compound | Solubility |
|---|---|---|
| $PANI(CSA)_{0.5}$ | 3-methoxy phenol | Good |
| $PANI(DBSA)_{0.5}$ | 3-methoxy phenol | Moderate |
| $PANI(MSA)_{0.5}$ | 3-methoxy phenol | No |
| $PANI(CSA)_{0.5}$ | 2-methyl-4-methyl phenol | Good |
| $PANI(DBSA)_{0.5}$ | 2-methyl-4-methyl phenol | Poor |
| $PANI(MSA)_{0.5}$ | 2-methyl-4-methyl phenol | No |
| $PANI(CSA)_{0.5}$ | m-cresol | Good |
| $PANI(DBSA)_{0.5}$ | m-cresol | Poor |
| $PANI(MSA)_{0.5}$ | m-cresol | No |
| $PANI(CSA)_{0.5}$ | p-cresol | Moderate |
| $PANI(DBSA)_{0.5}$ | p-cresol | No |
| $PANI(MSA)_{0.5}$ | p-cresol | No |

One concludes that the high solubility to 3-methoxy phenol, 2-methyl-4-methyl phenol, m-cresol and p-cresol, as taught by WO 92/22911, is limited to PANI protonated by selected i.e. specific sulphonic acid counter ions, such as CSA.

In particular WO 92/22911 does not teach how to render PANI doped by any sulphonic acid (such as the simplest sulphonic acid MSA) or in general organic acid highly soluble.

Comparative Example 1a $PANI(DBSA)_{0.5}$, $PANI(CSA)_{0.5}$ and $PANI(MSA)_{0.5}$ were prepared using Method A-2. The solubility of 10 parts by weight of $PANI(DBSA)_{0.5}$, $PANI(CSA)_{0.5}$ and $PANI(MSA)_{0.5}$ to 90 parts by weight of hydroquinone (HQ) or Methyl hydroquinone MeHQ was studied according to Method B using mixing temperature of 200°–210° C.

TABLE 3a

Solubility of PANI(CSA)$_{0.5}$, PANI(DBSA)$_{0.5}$, and PANI(MSA)$_{0.5}$ to Hydroquinone and Methyl hydroquinone HO—⌬—OH  Hydroquinone

| PANI-complex | Organic compound | Solubility |
|---|---|---|
| PANI(CSA)$_{0.5}$ | Hydroquinone | Good |
| PANI(DBSA)$_{0.5}$ | Hydroquinone | Good |
| PANI(MSA)$_{0.5}$ | Hydroquinone | Good |
| PANI(CSA)$_{0.5}$ | Methyl hydroquinone | Good |
| PANI(DBSA)$_{0.5}$ | Methyl hydroquinone | Good |
| PANI(MSA)$_{0.5}$ | Methyl hydroquinone | Good |

One concludes that PANI doped even with the simplest suphonic acid MSA is soluble to HQ and MeHQ, in contrast to WO 92/22911 as is described in Comparative Example IIIa (outside of the Invention).

Note that hydroquinone contains two strongly hydrogen bonding moieties (OH-groups) and a phenyl group, capable of phenyl/phenyl interaction with six-membered ring of PANI. Therefore, if one adds another strongly hydrogen bonding moiety i.e. an OH-group, to 3-methoxy phenol, 2-methyl-4-methyl phenol, m-cresol and p-cresol of WO 92/22911, astonishingly a solvent of PANI(MSA)$_{0.5}$ is rendered.

Comparative Example 2

PANI(MSA)$_{0.5}$ was prepared using Method A-2. The solubility of 10 parts by weight of PANI(MSA)$_{0.5}$ to 90 parts by weight to 3-hydroxy benzoic acid was studied according to Method B using mixing temperature of 210°–215° C.

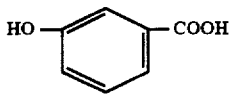

3-Hydroxy benzoic acid

3-Hydroxy benzoic acid is found to be a solvent of PANI (MSA)$_{0.5}$. Compared with Comparative Example 1, one concludes that one can replace one of the OH-groups by a COOH-group. In this case one has two hydrogen bonding groups (one OH and one COOH) and one phenyl group capable of phenyl/phenyl interaction with the six membered ring of PANI.

PANI(MSA)$_{0.5}$ was prepared using Method A-2. The solubility of 10 parts by weight of PANI(MSA)$_{0.5}$ to 90 parts by weight to DL-mandelic acid was studied according to Method B using mixing temperature of 210°–215° C.

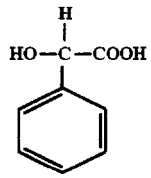

DL-mandelic acid

DL-mandelic acid is not a solvent of PANI(MSA)$_{0.5}$, although it also possesses one OH, one COOH and one phenyl group as 3-hydroxy benzoic acid. Therefore one concludes that the steric positions of the three groups are important.

Computations suggest that the distances of the hydrogen bonding groups of the solvents have to match the distances of hydrogen bonding moieties of PANI(MSA)$_{0.5}$ i.e. the amines and the sulphonates due to the protonated acids i.e. ca 6 Å. In addition the structures have to be stiff.

Comparative Example 3a

Comparative Example 2a was repeated for PANI(MSA)$_{0.5}$ in combination with a variety of aromatic organic compounds containing at least two hydrogen bonding moieties and at least one phenyl ring capable phenyl/phenyl interaction with the six-membered rings of PANI.

TABLE 4a

Solvents of PANI(MSA)$_{0.5}$

| Organic compound | Solubility for PANI(MSA)$_{0.5}$ | Functionalities |
|---|---|---|
| 1,4-dihydroxybenzene | Good | OH,OH,Phenyl |
| 1,3-dihydroxybenzene | Good | OH,OH,Phenyl |
| 1,2-dihydroxybenzene | Good | OH,OH,Phenyl |
| Bisphenol F | Good | OH,OH,Phenyl,Phenyl |
| Bisphenol A | Good | OH,OH,Phenyl,Phenyl |
| 2,4-Dihydroxybenzophenone | Good | OH,OH,CO,Phenyl, Phenyl |
| 4-Hydroxypropiophenone | Good | OH,CO,Phenyl |
| 2,5-Dihydroxy biphenyl | Good | OH,OH,Phenyl,Phenyl |
| Methyl gallate | Good | OH,OH,OH,COO,Phenyl |
| 3-hydroxy benzoic acid | Good | OH,COOH,Phenyl |

Comparative Example IVa (Outside of the Invention)

The Comparative Example 3a was repeated for PANI (MSA)$_{0.5}$ by using organic compounds that have only one strong hydrogen bonding moiety;

TABLE 5a

Nonsolvents of PANI(MSA)$_{0.5}$

| Organic compound | Solubility for PANI(MSA)$_{0.5}$ | Functionalities |
|---|---|---|
| Cumylphenol | Poor | OH,Phenyl,Phenyl |
| 2-Phenyl phenol | Poor | OH,Phenyl,Phenyl |
| Octyloxybenzoic acid | Poor | COOH,Phenol (Note: —O— marginal hydrogen bonding moiety) |
| Toluene sulphonamide | Poor | SO$_2$NH$_2$, Phenyl |

One can conclude from Comparative Example 3a and Comparative Example IVa (Outside of the Invention) that PANI protonated with the simplest sulphonic acid MSA is astonishingly soluble to aromatic compounds where there are at least two strong hydrogen bonding moieties at the periodicity of hydrogen bonding moieties of PANI(MSA)$_{0.5}$ i.e. ca 6 Å, in combination with at least one aromatic ring capable of hydrogen bonding with the six-membered ring of PANI.

Comparative Example 4a

Comparative Example 3a was repeated for PANI protonated by a "functionalized counter ion" of WO 92/22911 to form PANI(DBSA)$_{0.5}$ with a variety of aromatic organic compounds containing at least two hydrogen bonding moieties and at least one phenyl ring capable phenyl/phenyl interaction with the six-membered rings of PANI.

TABLE 6a

Solvents of PANI(DBSA)$_{0.5}$

| Organic compound | Solubility for PANI(DBSA)$_{0.5}$ | Functionalities |
|---|---|---|
| 1,4-dihydroxybenzene | Good | OH,OH,Phenyl |
| 1,3-dihydroxybenzene | Good | OH,OH,Phenyl |
| 1,2-dihydroxybenzene | Good | OH,OH,Phenyl |
| Bisphenol F | Good | OH,OH,Phenyl,Phenyl |
| Bisphenol A | Good | OH,OH,Phenyl,Phenyl |
| 2,4-Dihydroxybenzophenone | Good | OH,OH,CO,Phenyl,Phenyl |
| 4-Hydroxypropiophenone | Good | OH,CO,Phenyl |
| 2,5-Dihydroxy biphenyl | Good | OH,OH,Phenyl,Phenyl |
| Methyl gallate | Good | OH,OH,OH,COO,Phenyl |
| 3-hydroxy benzoic acid | Good | OH,COOH,Phenyl |

Comparative Example 5a

Comparative Example IVa (Outside of the Invention) was repeated for PANI protonated by a "functionalized counter ion" of WO 92/22911 to form PANI(DBSA)$_{0.5}$ with cumylphenol, 2-phenyl phenol. In addition, the solubility was tested with PANI(TSA)$_{0.5}$.

TABLE 7

Solvents of PANI(DBSA)$_{0.5}$ and PANI(TSA)$_{0.5}$ and PANI(MSA)$_{0.5}$

Cumylphenol

2-Phenyl phenol

| Organic Compound | PANI-complex | Solubility | Functionalities |
|---|---|---|---|
| Cumylphenyl | PANI(DBSA)$_{0.5}$ | Good | OH, Phenyl, Phenyl |
| 2-Phenyl phenol | PANI(DBSA)$_{0.5}$ | Good | OH, Phenyl, Phenyl |
| Cumylphenyl | PANI(TSA)$_{0.5}$ | Poor | OH, Phenyl, Phenyl |
| 2-Phenyl phenol | PANI(TSA)$_{0.5}$ | Poor | OH, Phenyl, Phenyl |
| Cumylphenyl | PANI(MSA)$_{0.5}$ | No | OH, Phenyl, Phenyl |
| 2-Phenyl phenol | PANI(MSA)$_{0.5}$ | No | OH, Phenyl, Phenyl |

Two conclusions can be made:

A) According to Comparative Example IIIa (Outside of the Invention), PANIDBSA)0.5 is not well soluble to 3-methoxy phenol, 2-methyl-4-methyl phenol, m-cresol and p-cresol (which are typical examples of WO 92/22911).

In contrast, the present invention astonishingly introduces novel solvents where PANI(DBSA)0.5 is well soluble. Adding the second phenyl ring, capable of phenyl/phenyl interaction with PANI six-membered ring, astonishingly renders solubility. This example also prove that the phenyl-rings have an essential role in the bonding.

B) According to Comparative Example IVa (Outside of the Invention), PANI(MSA)$_{0.5}$ is not soluble to cumylphenol or 2-Phenyl phenol. MSA is the simplest sulphonic acid. However, selecting the counter ion to be more "functional" DBSA, renders that PANI (DBSA)0.5 soluble to them. Therefore, organic compounds capable of two phenyl/phenyl interactions but only one hydrogen bonding are not solvents for PANI doped by a generic sulphonic acid but require more specific counterion.

One can therefore conclude that two remarkable features are characteristic to the novel solvents invented in this work:

For PANI protonated by the counter ions typical of WO 92/2291 1, they render higher solubility; and They uniquely render solubility for any sulphonic acid doped PANI in contrast to WO 92/22911.

Example 6a

Comparative Example 5a was repeated for phenothiazine.

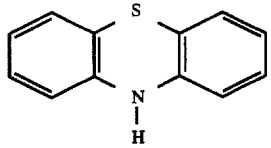
Phenothiazine

| Organic Compound | PANI-complex | Solubility | Functionalities |
|---|---|---|---|
| Phenothiazine | PANI(CSA)$_{0.5}$ | Good | S, NH, 3 fused rings |
| Phenothiazine | PANI(DBSA)$_{0.5}$ | Good | S, NH, 3 fused rings |
| Phenothiazine | PANI(TSA)$_{0.5}$ | Poor | S, NH, 3 fused rings |
| Phenothiazine | PANI(MSA)$_{0.5}$ | No | S, NH, 3 fused rings |

One concludes that the present invention is not limited to hydroxyl-containing aromatic compounds.

Comparative Example I (Outside of the Invention)

Polyaniline (PANI) prepared according to Method A-1, was protonated according to method A-2 with dodecylbenzenesulfonic acid, (DBSA), (Tokyo Kasei), to give the electrically conducting polyaniline salt complex PANI (DBSA)$_{0.5}$. PANI(DBSA)$_{0.5}$ was mixed, according to Method B, with, respectively, 1-decanol (Merck), 1,8-octanediol (Fluka), lauryl acid (Fluka), dodecyl amine (Fluka), stearic acid (Aldrich), Zn-stearate (Aldrich) and octyl succinic acid. The latter compound was prepared by mixing 100 g of n-ocytl succinic anhydride (Chemie Linz) with 500 g distilled water at 60° C. for 30 minutes, filtered and dried the reaction product at 100° C. over night. The solubility of PANI(DBSA)$_{0.5}$ in the above organic compounds was examined using an optical microscope. In all cases a clear dispersion of solid, unswollen PANI(DBSA)$_{0.5}$ particles was observed and PANI(DBSA)$_{0.5}$ was found to be completely insoluble in these compounds.

Comparative Example II (Outside of the Invention)

PANI(DBSA)$_{0.5}$ was mixed with 3-pentadecyl phenol (Aldrich) or (o,p)-toluenesulfonamide (Ketjenflex 9S, Akzo) according to Method B. The solubility of PANI(DBSA)$_{0.5}$ in these compounds was examined using an optical microscope. A clear dispersion of solid, unswollen PANI(DBSA)$_{0.5}$ particles was observed and PANI(DBSA)$_{0.5}$ was found to be insoluble in these organic compounds.

A polymer blend was prepared of PANI(DBSA)$_{0.5}$ and 3-pentadecyl phenol and HDPE at 1 90° C. according to Method C, and of PANI(DBSA)$_{0.5}$ and tert-octyl phenol and PP at 170° C. according to Method D. The conductivity of the materials in both cases was below $1 \times 10^{-9}$ S/cm.

Comparative Example III (Outside of the Invention)

Comparative Example II (Outside of the Invention) was repeated with a variety of substituted aromatic compounds. All substances were found to be non-solvents for PANI (DBSA)$_{0.5}$ according to Method B. Blends with polypropylene were prepared according to Method D. The results of the conductivity measurements are summarized in Table 1.

TABLE 1

Conductivity of PANI(DBSA)$_{0.5}$/PP blends prepared with various substituted aromatic compounds.

| Compound | Conductivity, (S/cm) |
| --- | --- |
| 2,6 di-tert-butyl-4-methylphenol [BHT] | $3.2 \times 10^{-9}$ |
| 3-pentadecylphenol | $1.0 \times 10^{-9}$ |
| phenylsulfone | $5.4 \times 10^{-10}$ |
| phenylsulfoxide | $5.4 \times 10^{-10}$ |
| 4-aminophenol-dodecylbenzenesulfonic acid | $1.1 \times 10^{-11}$ |
| 2-aminophenol-dodecylbenzenesulfonic acid | $1.3 \times 10^{-9}$ |
| cyclohexanediamine-(dodecylbenzenesulfonic acid)$_2$ | $9.7 \times 10^{-9}$ |
| 2-amino-4-ethylsulfonylphenol-dodecylbenzenesulfonic acid | $4.4 \times 10^{-10}$ |
| aminophenyl ether-dodecylbenzenesulfonic acid | $<10^{-11}$ |

Comparative Examples II–III demonstrate that non-solvent plasticizers do not lead to reduced percolation thresholds for the onset of conductivity in blends with the insulating polypropylene.

EXAMPLE 1

PANI(DBSA)0.5 PANI(DBSA)0.5 was mixed with tert-butyl hydroquinone (Fluka) according to Method B at 200° C. and was found to form a homogeneous, particle-free solution with this substituted aromatic compound.

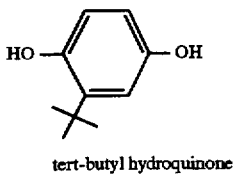

tert-butyl hydroquinone

A blend was prepared of PANI(DBSA)$_{0.5}$, tert-butyl hydroquinone (Fluka) and high density polyethylene, (HDPE, Neste NCPE 3415), according to Method C at 190° C. The electrical conductivity was determined to be $3.5 \times 10^4$ S/cm.

Comparative Example IV (Outside of the Invention)

By contrast, PANI(DBSA)$_{0.5}$ was not soluble in 3-tert-butyl-4-hydroxyanisole (Fluka) when mixed at 200° C. according to Method B.

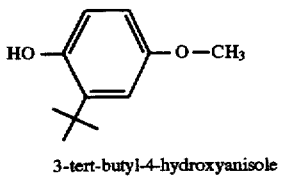

3-tert-butyl-4-hydroxyanisole

This example clearly demonstrates that replacing only one hydroxy group in the substituted aromatic compound of Example 1 by an alkoxy group changes the compound from being an excellent solvent to a non-solvent for PANI(DBSA)$_{0.5}$ due to the insufficient hydrogen bonding capability of the alkoxy substituent.

A blend was prepared of PANI(DBSA)$_{0.5}$,3-tert-butyl-4-hydroxyanisole (Fluka) and high density polyethylene, (HDPE, Neste NCPE 3415), according to Method C at 190° C. The electrical conductivity of the resulting blend was less $10^9$ S/cm.

This result clearly illustrates that use of the non-solvent plasticizer yielded a value of the electrical conductivity that is more than 100,000 times smaller than the same blend composition comprising the solvent-plasticizer in Example 1.

EXAMPLE 2

Example 1 was repeated; blends were prepared, according to Method C, of PANI(DBSA)$_{0.5}$, high density polyethylene and a variety of substituted aromatic compounds, all of which were determined to be solvents for the conductive polyaniline salt complex according to Method B. The values of the electrical conductivities of the blends are collected in Table 2.

TABLE 2

Electrical conductivities of blends of PANI(DBSA)$_{0.5}$, polyethylene and various substituted aromatic compounds

| Compound | Conductivity, (S/cm) |
| --- | --- |
| catechol | $3.5 \times 10^{-2}$ |
| hydroquinone | $1.0 \times 10^{-4}$ |
| resorcinol | $2.1 \times 10^{-3}$ |
| resorcinolmonobenzoate | $7.6 \times 10^{-4}$ |
| 4-hydroxybenzophenone | $6.9 \times 10^{-4}$ |
| bisphenol-A | $1.0 \times 10^{-5}$ |
| 2,4-dihydroxyacetophenone | $2.2 \times 10^{-2}$ |

EXAMPLE 3

PANI(DBSA)0.5 was mixed with propyl-3,4,5-trihydroxybenzoate (propyl gallate, PG; Merck) at 200 ° C. according to Method B and found to form a homogeneous solution.

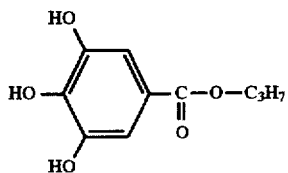

propyl-3,4,5-trihydroxybenzoate
(propyl gallate [PG])

A polymer blend was prepared according to Method D from PANI(DBSA)0.5, propyl gallate, and polypropylene. The measured electrical conductivity of the resulting blend was $5.1 \times 10^{-2}$ S/cm.

Comparative Example V (Outside of the Invention)

PANI(DBSA)0.5 was mixed at 200° C. with alkyldimethylolphenol (SP 1045, Schenectady Corp.) according to Method B. It was found that this substituted aromatic compound was not a solvent for PANI(DBSA)$_{0.5}$.

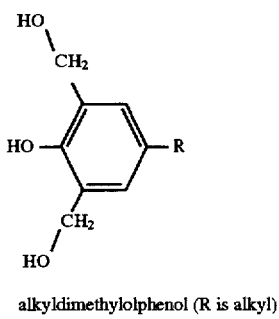

alkyldimethylolphenol (R is alkyl)

This example demonstrates that the position of the three OH-groups relative to the phenyl ring is critical.

A polymer blend was prepared according to Method C from PANI(DBSA)0.5, alkyldimethylolphenol, and polyethylene. The measured electrical conductivity of the resulting blend was less than $10^{-9}$ S/cm.

EXAMPLE 4

Example 3 was repeated; blends were prepared, according to method D, of PANI(DBSA)$_{0.5}$, polypropylene and a great variety of substituted aromatic compounds, all of which were determined to be solvents for the conductive polyaniline salt complex according to Method B. The values of the electrical conductivities of the blends are collected in Table 3.

TABLE 3

Electrical conductivities of blends of PANI(DBSA)$_{0.5}$, polypropylene and various substituted aromatic compounds

| Compound | Conductivity, (S/cm) |
| --- | --- |
| 4-phenylphenol | $1.9 \times 10^{-3}$ |
| 2-phenylphenol | $1.9 \times 10^{-3}$ |
| hydroquinone benzyl ether | $6.3 \times 10^{-5}$ |
| benzyl 4-hydroxybenzoate | $1.3 \times 10^{-3}$ |
| bisphenol A | $1.3 \times 10^{-5}$ |
| dodecyl 4-hydroxybenzoate | $4.0 \times 10^{-4}$ |
| ethyl dihydroxybenzoate | $1.4 \times 10^{-3}$ |
| 3,3'-ethylenedioxydiphenol | $1.1 \times 10^{-4}$ |
| tert-butylhydroquinone | $3.5 \times 10^{-4}$ |
| tert-butylcatechol | $3.4 \times 10^{-4}$ |
| phenylhydroquinone | $3.8 \times 10^{-4}$ |
| p-cumylphenol | $3.8 \times 10^{-2}$ |
| 2,4-dihydroxybenzophenone | $1.4 \times 10^{-4}$ |
| dodecylresorcinol | $2.1 \times 10^{-2}$ |
| 2-hydroxydiphenylmethane | $9.0 \times 10^{-2}$ |
| 2,3,4-trihydroxybenzophenone | $5.6 \times 10^{-4}$ |
| ethyl gallate | $2.3 \times 10^{-2}$ |
| stearyl gallate | $3.4 \times 10^{-1}$ |

EXAMPLE 5

Example 3 was repeated, but instead of 1.05 g, only 0.53 g of the substituted aromatic compound was used; blends were prepared, according to method D, of PANI(DBSA)$_{0.5}$, polypropylene and a variety a of gallates, all of which were determined to be solvents for the conductive polyaniline salt complex according to Method B. The values of the electrical conductivities of the blends are collected in Table 4.

TABLE 4

Electrical conductivities of blends of PANI(DBSA)$_{0.5}$, polypropylene and various gallates*

| Compound | Conductivity, (S/cm) |
| --- | --- |
| ethyl gallate (EG) | $7.1 \times 10^{-3}$ |
| propyl gallate (PG) | $9.1 \times 10^{-3}$ |
| butyl gallate | $6.6 \times 10^{-2}$ |
| iso-amyl gallate | $3.6 \times 10^{-2}$ |
| octyl gallate | $2.1 \times 10^{-2}$ |
| dodecyl gallate | $1.6 \times 10^{-2}$ |
| cetyl gallate | $1.1 \times 10^{-2}$ |
| stearyl gallate (SG) | $7.4 \times 10^{-4}$ |

*a significantly smaller amount of gallates was employed.

EXAMPLE 6

Example 3 was repeated, but instead of PANI(DBSA)$_{0.5}$, conductive polyaniline salt complexes were used that were protonated with CSA, TSA, according to Method A-2. HCl-protonated PANI was used directly as recovered from the polymerization in Method A-1. Blends were prepared, according to method D, of the salt complexes, polypropylene and various substituted aromatic compounds. The values of the electrical conductivities of the blends are collected in Table 5.

TABLE 5

Electrical conductivities of blends of polypropylene, various substituted aromatic compounds, and polyaniline protonated with different acids.

| Protonic Acid | Subst. Arom. Compound | Conductivity, (S/cm) |
| --- | --- | --- |
| CSA | EG | $2.2 \times 10^{-3}$ |
| CSA | PG | $1.0 \times 10^{-3}$ |
| CSA | SG | $2.3 \times 10^{-1}$ |
| CSA | HBBzE* | $3.0 \times 10^{-3}$ |
| TSA | SG | $5.3 \times 10^{-1}$ |
| TSA | EG | $1.0 \times 10^{-6}$ |
| TSA | dodecylresorcinol | $2.2 \times 10^{-3}$ |
| TSA | HBDE** | $4.0 \times 10^{-4}$ |
| HCl | SG | $<6 \times 10^{-11}$ |

*HBBzE: p-hydroxybenzoic acid benzyl ester
**HBDE: p-hydroxybenzoic acid dodecyl ester In all of the above cases the substituted aromatic compounds were solvents for the conductive polyaniline salt complexes; except for the complex protonated with HCl. As is clear from the above table, the latter blend, accordingly, did not exhibit an improved conductivity.

EXAMPLE 7

Blends were prepared according to the procedures of Method D [however, at 190° C., instead of 170° C. ] of nylon 12 (Polysciences), PANI(CSA)$_{0.5}$, and EG and SG, which both dissolve the conductive complex. The electrical conductivities were measured to be $1 \times 10^{-3}$ and $1 \times 10^{-11}$ for the compositions containing EG and SG, respectively. This example shows that the substituted aromatic compounds that dissolve conductive polyaniline salt complexes need to be compatible with the physico-chemical nature of the insulating matrix polymer. Here, the polar nylon 12 displays a dramatically enhanced conductivity with the gallate EG, which is relatively polar. By contrast, the very long alkyl tail of SG is nonpolar, and therefore is not optimal for blending with nylon 12, leading to a very low conductivity.

The inverse phenomenon, although somewhat less dramatic, is seen in some blends of Example 6. Here PANI(TSA)$_{0.5}$ was mixed with SG and EG into the nonpolar polypropylene. Due to the non-polar alkyl tail of SG, the composition containing this gallate has a much higher conductivity than the blends comprising the more polar EG; see Table 5.

EXAMPLE 8

Blends were prepared according to Method D of polypropylene and various amounts of PANI(DBSA)$_{0.5}$.Stearyl gallate (SG) was employed as the substituted aromatic compound. The electrical conductivity of the blends are plotted as a function of the content of the conducting polyaniline salt complex in FIG. 1. This graph shows that the blend prepared according to this invention displays a percolation threshold of less than 1% by weight of PANI(DBSA)$_5$.

EXAMPLE 9

Example 8 was repeated with nylon 12, PANI(CSA)$_{0.5}$, and EG instead of polypropylene. PANI(DBSA)$_{0.5}$ and SG. Mixing was carried out at 190° C. The electrical conductivity of the blends as a function of the content of the conducting polyaniline salt complex was very similar as the results plotted in FIG. 1.

EXAMPLE 10

An amount of 2.538 g (0.01M) of PANI(DBSA)$_{0.5}$ salt prepared according to Method A-2 was mixed with 2.112 g (0.005M) stearyl gallate (SG) (Tokyo Kasei) in a miniature conical twin-screw extruder at 170° C. during 5 min. The resulting PANI(DBSA)$_{0.5}$(SG)$_{0.5}$ complex was pulled out from the orifice of the extruder as continuous filament. In the same manner, PANI(CSA)$_{0.5}$, PANI(TSA)$_{0.5}$ were complexed with SG at the same molar ratio at 170° C. during 5 min.

EXAMPLE 11

Example 10 was repeated, but ethyl gallate (EG) and phenylhydroquinone (PhHQ) were used at molar ratio 0.5 to PANI(DBSA)$_{0.5}$ instead of SG.

EXAMPLE 12

The polyaniline compositions of Examples 10 and 11 were characterized by differential scanning calorimetry, conductivity of pressed pellets or films; and wide-angle X-ray diffraction patterns.

Conductivity of thin films or pellets pressed at 170° C. measured by the usual four probe method are listed in Table 6.

TABLE 6

Conductivity of various conductive PANI salt complexes.

| Composition | Conductivity (S/cm) |
|---|---|
| PANI(DBSA)$_{0.5}$ | 0.6 |
| PANI(DBSA)$_{0.5}$(EG)$_{0.5}$ | 14.1 |
| PANI(DBSA)$_{0.5}$(SG)$_{0.5}$ | 14.5 |
| PANI(DBSA)$_{0.5}$(PhHQ)$_{0.5}$ | 2.2 |
| PANI(CSA)$_{0.5}$ | 0.7 |
| PANI(CSA)$_{0.5}$(EG)$_{0.5}$ | 7.0 |
| PANI(CSA)$_{0.5}$(SG)$_{0.5}$ | 15.7 |
| PANI(TSA)$_{0.5}$ | — |
| PANI(TSA)$_{0.5}$(EG)$_{0.5}$ | 3.0 |
| PANI(TSA)$_{0.5}$(SG)$_{0.5}$ | 10.3 |

The data in this table demonstrate that the conductivity values of the compositions with EG and SG additives is higher than in those without, despite the fact that the weight fraction of these [not electrically conductive] additives in the final compositions is ca. 30% and 50% for EG and SG, respectively.

Melting points of these complexes were determined by differential scanning calorimetry (Mettler TA 3000; scan rate 10° C./min), and are listed in Table 7.

TABLE 7

Melting points of various PANI salt complexes.

| Composition | Melting point (°C.) |
|---|---|
| EG (for reference) | 145.6 |
| SG (for reference) | 106.2 |
| PANI(DBSA)$_{0.5}$(EG)0.5 | 97.5 |
| PANI(DBSA)$_{0.5}$(SG)$_{0.5}$ | 80.5 |
| PANI(CSA)$_{0.5}$(EG)$_{0.5}$ | 130.2 |
| PANI(CSA)$_{0.5}$(SG)$_{0.5}$ | 76.5 |
| PANI(TSA)$_{0.5}$(EG)$_{0.5}$ | 111.2 |
| PANI(TSA)$_{0.5}$(SG)$_{0.5}$ | 85.8 |

In the polarizing optical microscope, at the temperature denoted above, these complexes became transparent green highly viscous fluids, which displayed birefrigence after mild shearing. These results indicate that the polyaniline complexes PANI(DBSA)0.5, PANI(CSA)$_{0.5}$ and PANI (TSA)$_{0.5}$ [which themselves are not meltable below their respective decomposition temperatures] displayed a melting point after complexing with 0.5 mole (per one PhN unit) of these substituted aromatic compounds. The data also reveal that the melting temperature can be controlled by the selection of the chemical nature of these compounds.

Figure 2:
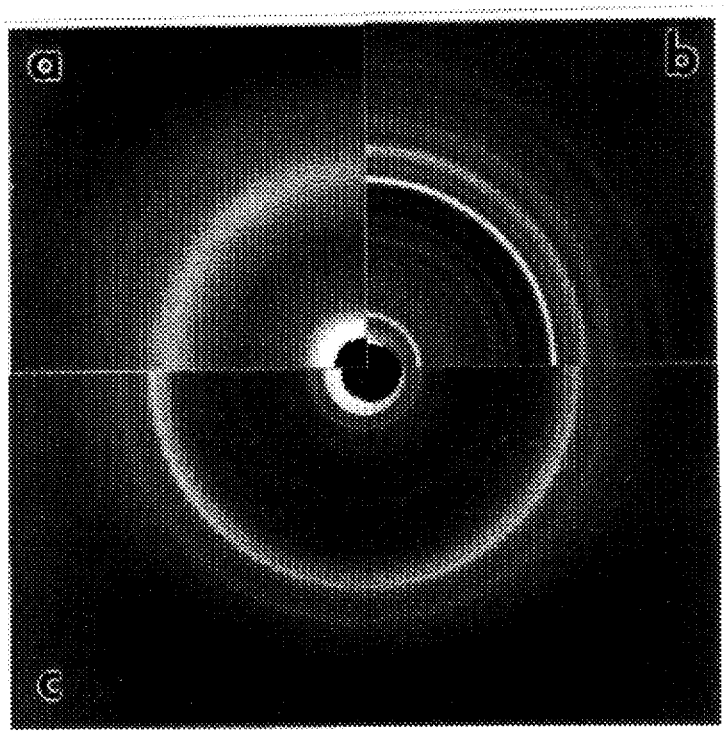
FIG. 2. Wide-angle X-ray diffraction patterns of, respectively (a) $PANI(DBSA)_{0.5}$, (b) SG and the composition (c) $PANI(DBSA)0.5(SG)_{0.5}$.

Wide-angle X-ray diffraction patterns of (a) PANI(DBSA)$_{0.5}$, (b) SG and (c) the composition PANI(DBSA)$_{0.5}$(SG)$_{0.5}$ are shown in FIG. 2. From these patterns it is clear that a new crystal phase was obtained after complexing of PANI salts containing 0.5 moles protonic acid with the solvating compounds SG. All strong reflections of SG disappeared after complexing and the spacings of PANI(DBSA)$_{0.5}$(SG)0.5 are found at different angles from those of the initial PANI (DBSA)$_{0.5}$ complexes. In addition, it is revealed by these patterns that the crystallinity is also improved by 0.5 mole solvating compound that were incorporated into PANI lattice. Similar results were obtained for the PANI(CSA)$_{0.5}$ (SG)$_{0.5}$ and PANI(TSA)$_{0.5}$ (SG)$_{0.5}$; and other substituted aromatic compounds such as EG, PG, DG and phenylhydroquinone.

These results suggest unambiguously that conductive PANI salts may form crystalline solvates with substituted aromatic compounds of new crystal structures, and controlled melting temperatures.

We claim:

1. Liquid-phase processible electrically conductive polymeric composition consisting of an admixture of:

(a) one or more electrically conductive protonated polymer complexes selected from the group consisting of polyaniline, substituted polyanilines, and copolymers thereof;

(b) one or more substituted cyclic organic compounds according to Formula I:

wherein:

i is an integer greater than 0;

j is an integer greater than 1, with the proviso that the sum of i and j is equal to or greater than 3;

A is a moiety which forms ring-ring interactions with the six-membered rings of said electrically conducting polyaniline complexes; and is independently selected so as to be the same or different at each occurrence and is selected from the group consisting of substituted or unsubstituted 3, 4, 5, 6 or 7-membered aromatic or alicyclic rings, which rings may optionally include one or more nitrogen, sulfur or oxygen atoms; and their substituted or unsubstituted condensed rings; and B is a moiety which forms hydrogen bonds to the electrically conducting polyaniline complex; and is independently selected so as to be the same or different at each occurrence and is selected from the group consisting of —OH, —COOH, —COO—, —CO—, —SO—, —SO$_2$—, —OCOO—, —S—, —PO$_3$—, —NO$_2$, —CON=;

wherein said substituted compound dissolves said electrically conductive polymer complex during melt processing, and wherein said substituted cyclic organic compound has a pKa greater than about 3; and (c) optionally, from about 1 to about 99.95 weight percent of one or more substantially insulating or semiconducting polymers or pre-polymers.

2. Electrically conductive polymeric composition according to claim 1 containing said from about 1 to about 99.95 weight percent of one or more substantially insulating or semiconducting polymers or pre-polymers.

3. Electrically conductive polymeric compositions according to claim 1 or 2 wherein:

A is independently selected so as to be the same or different at each occurrence and is selected from the group consisting of substituted or unsubstituted 5 or 6-membered aromatic rings, which rings may optionally include on or more nitrogen, sulfur or oxygen atoms; and their substituted or unsubstituted condensed rings; and at least one B is —OH.

4. Electrically conductive polymeric compositions according to claim 3 wherein the substituted compounds are of Formula II:

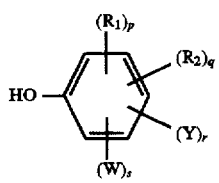

wherein p, q, r, and s are integers from 0 to 5, with the proviso that the sum of p and q and r and s is equal to 5;

R$_1$ is H, OH, CH$_3$ or OCH$_3$; where one or more H can be substituted by the halogens F or Cl; except in —OH;

R$_2$ is independently selected so as to be the same or different at each occurrence and is selected from the group consisting of H, OH, alkyl, alkenyl, alkoxy, alkanoyl, alkylthio, alkylthioalkyl, alkyl amide, alkylamidealkyl, alkyl hydroxy, alkyl carboxyl, having at least 1 carbon atom; or alkylaryl, arylalkyl, alkylsulfinyl, alkoxyalkyl, alkylsulfonyl, alkoxycarbonyl, where the alkyl or alkoxy has from 0 to about 20 carbon atoms; or alkyl having from 1 to about 20 carbon atoms; or any two R$_2$ groups together may form an alkylene or alkenylene chain completing a 3, 4, 5, 6, or 7-membered aromatic or alicyclic ring, which ring may optionally include one or more nitrogen, sulfur or oxygen atoms; R$_2$ can be branched and can be tert-alkyl, the alkyl having from 1 to about 20 carbon atoms; R$_2$ may include one or more of the polar substitutes —NO$_2$, or —CN, or the halogens, —F, —Cl, —Br, —I;

Y is independently selected so as to be the same or different at each occurrence and is selected from the group consisting of —OH, —COOH, —COO—Z, —CO—Z, —SO—Z, —SO$_2$—Z, —OCOO—Z, wherein Z=alkyl with 1 to about 20 carbon atoms;

W is independently selected so as to be the same or different at each occurrence and is selected from the group consisting of X$_1$, —C(C$_n$H$_{2n+1}$)(C$_m$H$_{2m+1}$)—X$_1$, where n and m are integers of at least 1, —COO—X$_1$, —CO—X$_1$, —OCO—X$_1$, —CH$_2$—O—X$_1$, —O—CH$_2$—X$_1$, —O—X$_1$, —S—$_1$, —SO—X$_1$, —SO$_2$—X$_1$, —OCOO—X$_1$, —COO—CH$_2$—X$_1$, —OCO—CH$_2$—X$_1$, —CH$_2$—COO—X$_1$, —CH$_2$—OCO—X$_1$, —O—C$_2$H$_4$—O—X$_1$, —CH$_2$—X$_1$, cyclohexane, or 5 or 6-membered aromatic, heteroalicyclic, heteroaromatic or alicyclic carbon ring; and

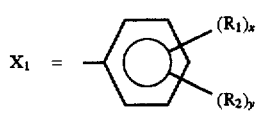

wherein:

x and y are integers from 0 to 5 with the proviso that the sum of x and y equals 5; and R$_1$ and R$_2$ are described above.

5. Electrically conductive polymeric compositions according to claim 4 wherein the substituted compounds are of Formulas IV–X:

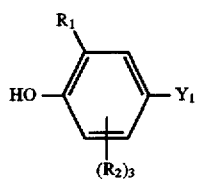

IV

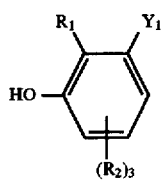

V

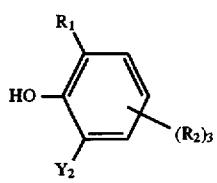

VI

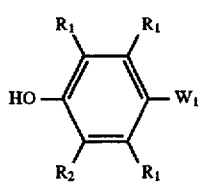

VII

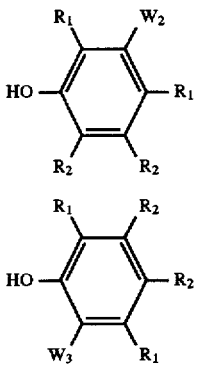

VIII

IX

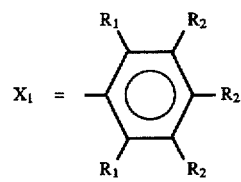

X wherein $R_1$ and $R_2$ are as described above.

wherein:

$R_1$ is independently selected so as to be the same or different at each occurrence and is selected from the group consisting of H, OH, $CH_3$ or $OCH_3$; where one or more H can be substituted by the halogens F or Cl; except in —OH;

$R_2$ is independently selected so as to be the same or different at each occurrence and is selected from the group consisting of H, OH, alkyl, alkenyl, alkoxy, alkanoyl, alkylthio, alkylthioalkyl, alkyl amide, alkylamidealkyl, alkyl hydroxy, alkyl carboxyl, having at least 1 carbon atoms; or alkylaryl, arylalkyl, alkylsulfinyl, alkoxyalkyl, alkylsulfonyl, alkoxycarbonyl, where the alkyl or alkoxy has from 0 to about 20 carbon atoms; or alkyl having from 1 to about 20 carbon atoms; or any two $R_2$ groups together may form an alkylene or alkenylene chain completing a 3, 4, 5, 6 or 7-membered aromatic or alicyclic ring, which ring may optionally include one or more nitrogen, sulfur or oxygen atoms; $R_2$ can be branched and can be tert-alkyl, the alkyl having of at least 1 carbon atoms; $R_2$ may include one or more of the polar substitutes —$NO_2$, or —CN, or the halogens, —F, —Cl, —Br, —I;

$Y_1$ is selected from the group consisting of —OH, —COOH, —COO—Z, —CO—Z, —SO—Z, —$SO_2$—Z, —OCOO—Z, wherein Z=alkyl with 1 to about 20 carbon atoms;

$Y_2$ is —OH;

$W_1$ is selected from the group consisting of $X_1$, —C($C_nH_{2n+1}$)($C_mH_{2m+1}$)—$X_1$, where n and m are integers of at least 1, —COO—$X_1$, —CO—$X_1$, —OCO—$X_1$, $CH_2$—O—$X_1$, —O—$CH_2$—$X_1$, —O—$X_1$, —S—$X_1$, —SO—$X_1$, —$SO_2$—$X_1$, —OCOO—$X_1$, cyclohexane, or 5 or 6-membered aromatic, heteroalicyclic, heteroaromatic or alicyclic carbon ring; and $W_2$ is selected from the group consisting of $X_1$, —$C_n$($H_{2n+1}$)($C_mH_{2m+1}$)—$X_1$, where n and m are integers of at least 1, —COO—$X_1$, —CO—$X_1$, —OCO—$X_1$, —O—$X_1$, —S—$X_1$, —SO—$X_1$, —$SO_2X_1$, —OCOO—$X_1$, —COO—$CH_2$—$X_1$, —OCO—$CH_2$—$X_1$, —$CH_2$—COO—$X_1$, —CH—OCO—$X_1$, —O—$C_2H_4$—O—$X_1$, cyclohexane, or 5 or 6-membered aromatic, heteroalicyclic, heteroaromatic or alicyclic carbon ring; and $W_3$ is selected from the group consisting of $X_1$, —C($C_nH_{2n+1}$)($C_mH_{2m+1}$)—$X_1$, where n and m are integers from 1 to about at least 20, —COO—$X_1$, —CO—$X_1$, —OCO—$X_1$, —O—$X_1$, —S—$X_1$, —SO—$X_1$, —$SO_2$—$X_1$, —OCOO—$X_1$, —$CH_2$—$X_1$, cyclohexane, or 5 or 6-membered aromatic, heteroalicyclic, heteroaromatic or alicyclic carbon ring;

and

6. Electrically conducting composition according to claim 5 wherein said substituted compounds are those according to Formulas IV-X;

with the proviso that at least one $R_1$, $R_2$, $Y_1$ or $Y_2$ substituent adjacent to at least one —OH substituent on any benzene ring is selected from the group consisting of H and —OH.

7. Electrically conducting composition according to claim 2 wherein said substantially insulating or semiconducting polymer is a thermoplastic polymer or thermoplastic prepolymer.

8. Electrically conducting composition according to claim 2 wherein said substantially insulating or semiconducting polymer is a thermoset polymer.

9. Electrically conducting composition according to claim 2 wherein said substantially insulating or semiconducting pre-polymer is a monomer.

10. Electrically conducting compositions according to claim 1 or 2 wherein said compositions have an electrical conductivity of at least about $10^{-9}$ S/cm.

11. Electrically conducting compositions according to claim 10 wherein said compositions have an electrical conductivity of at least about $10^{-6}$ S/cm.

12. Electrically conducting composition according to claim 11 wherein said composition has an electrical conductivity of at least about $10^{-3}$ S/cm.

13. Electrically conducting composition according to claim 12 wherein said composition has an electrical conductivity of at least about 1 S/cm.

14. Electrically conducting compositions according to claim 1 or 2 wherein said processing is carried out at a temperature of at least about 50° C.

15. Electrically conducting compositions according to claim 1 or 2 wherein said processing is carried out at a temperature of at least about 100° C.

16. Electrically conducting compositions according to claim 1 or 2 wherein said processing is carried out at a temperature of at least about 150° C.

17. Composition according to claim 1 wherein said substituted compounds form part of an oligomeric or polymeric chain molecule.

18. Composition according to claim 2 wherein said substituted compounds form part of an oligomeric or polymeric chain molecule.

19. Electrically conductive polymeric compositions according to claim 4, wherein Z is an alkyl having more than about 10 carbon atoms.

20. Electrically conductive polymeric compositions according to claim 5, wherein Z is an alkyl having more than about 10 carbon atoms.

21. Electrically conductive polymer compositions according to claim 1, wherein the substituted compound and the electrically conductive polymer complex form a homogeneous, one-phase liquid, free of any remaining solid particles when observed with a polarizing light optical microscope.

* * * * *